Aug. 17, 1926.  1,596,480
A. R. COSGROVE ET AL
EXTENSION FRAME
Filed Jan. 16, 1925    4 Sheets-Sheet 3

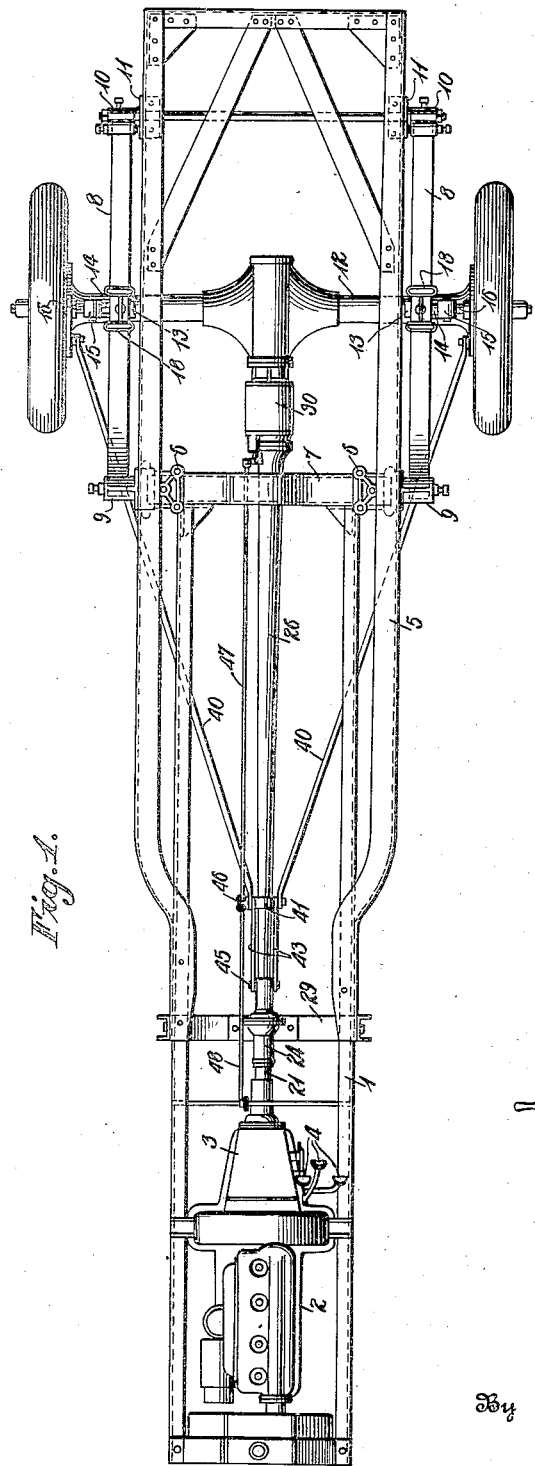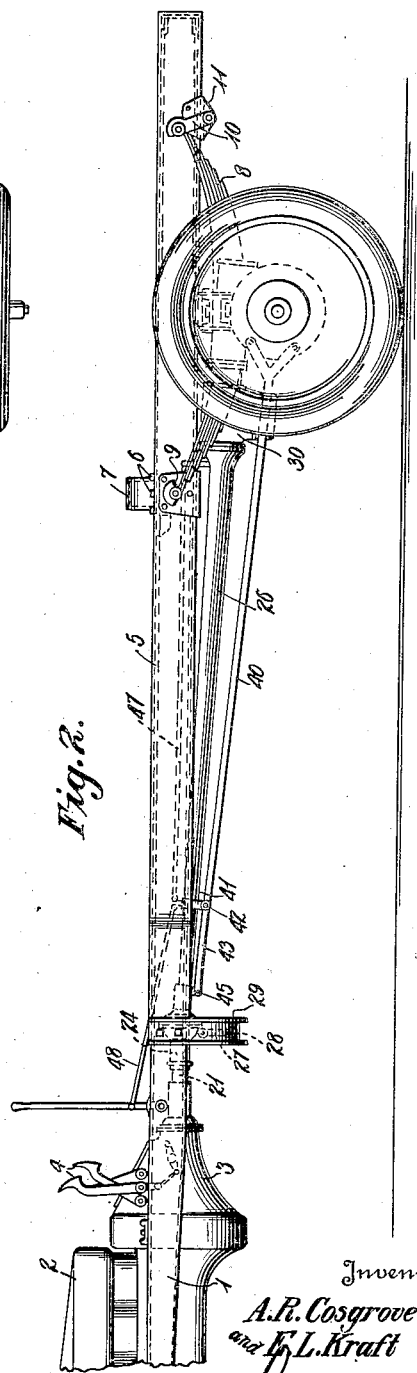

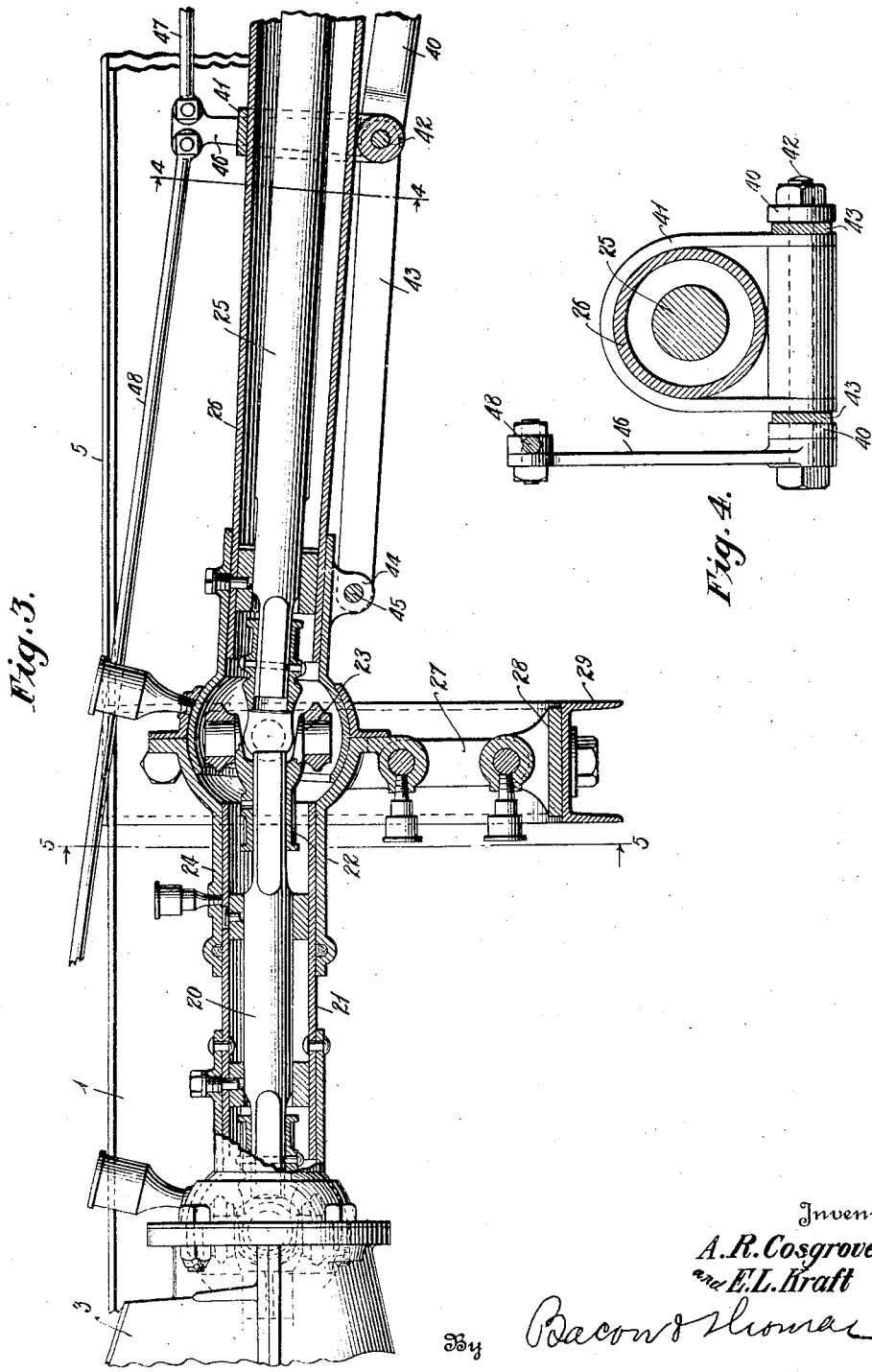

Inventors
A. R. Cosgrove
and E. L. Kraft
By Bacon & Thomas
Attorneys

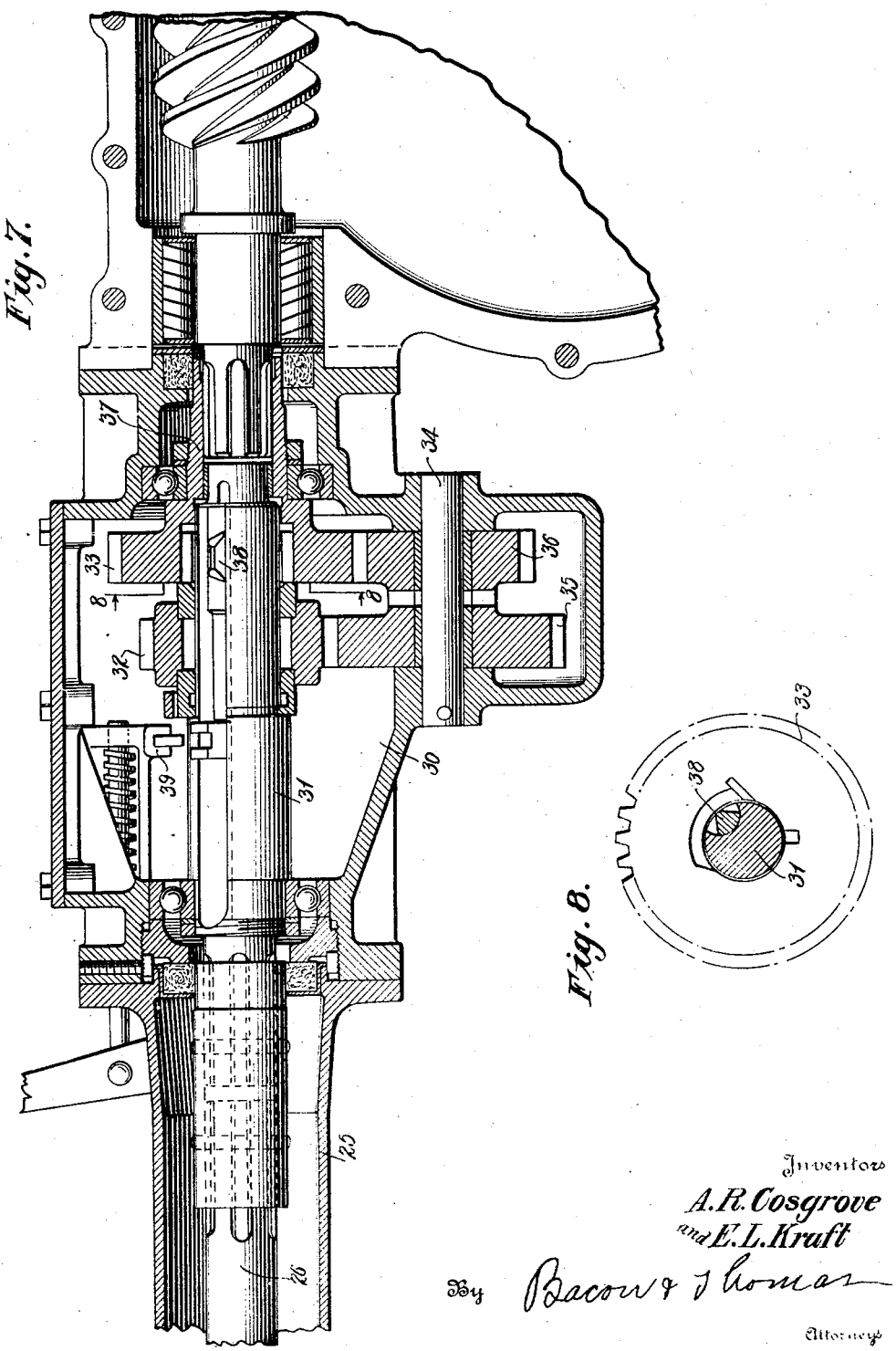

Patented Aug. 17, 1926.

1,596,480

UNITED STATES PATENT OFFICE.

ALLEN R. COSGROVE AND EDWARD L. KRAFT, OF YORK, PENNSYLVANIA, ASSIGNORS TO MARTIN-PARRY CORPORATION, OF YORK, PENNSYLVANIA, A CORPORATION OF DELAWARE.

EXTENSION FRAME.

Application filed January 16, 1925. Serial No. 2,910.

The invention relates to improvements in extension frames primarily intended for attachment to a Ford chassis, and improved transmission mechanism therefor.

When extension frames are added or applied to a standard truck of the Ford type to increase the wheel base and capacity thereof, the two forward speeds of the usual Ford planetary transmission are not as satisfactory in operation as they should be nor is the truck as economical in the consumption of fuel as is possible which is largely due to the wide difference in speed ratio between the high and low planetary gears. In the past it has been proposed to add to supplementary transmission of the planetary type to an extension frame for Ford trucks, but we have found that such transmissions which are usually placed beyond the differential require the addition of costly axle parts, and are, furthermore, not entirely satisfactory in use.

In carrying out the present invention we utilize with the extension frame a transmission of the constant mesh type of any desirable number of speeds, which transmission is interposed between the transmission shaft and the differential, and is used conjointly with the usual Ford planetary gearing. It will be understood that with the standard Ford truck where a planetary gearing is employed the clutch is of such a type that it does not entirely release at all times, and this invention is based on the discovery that when utilizing an auxiliary transmission having constantly meshing gears, changes in speed can be effected by means of this transmission without injuring the gears thereof even though the clutch does not entirely release, which important advantages cannot be obtained with the use of other types of transmission gearing positioned as herein specified.

A further object of the invention is to provide a connecting element for attaching the standard radius rods to the universal housing to permit the radius rods of the original truck to be employed, which rods otherwise would be useless because of the increased distance between the differential and the universal housing due to the interposed transmission.

In the accompanying drawing we have disclosed the preferred embodiment of this invention in which—

Figure 5:
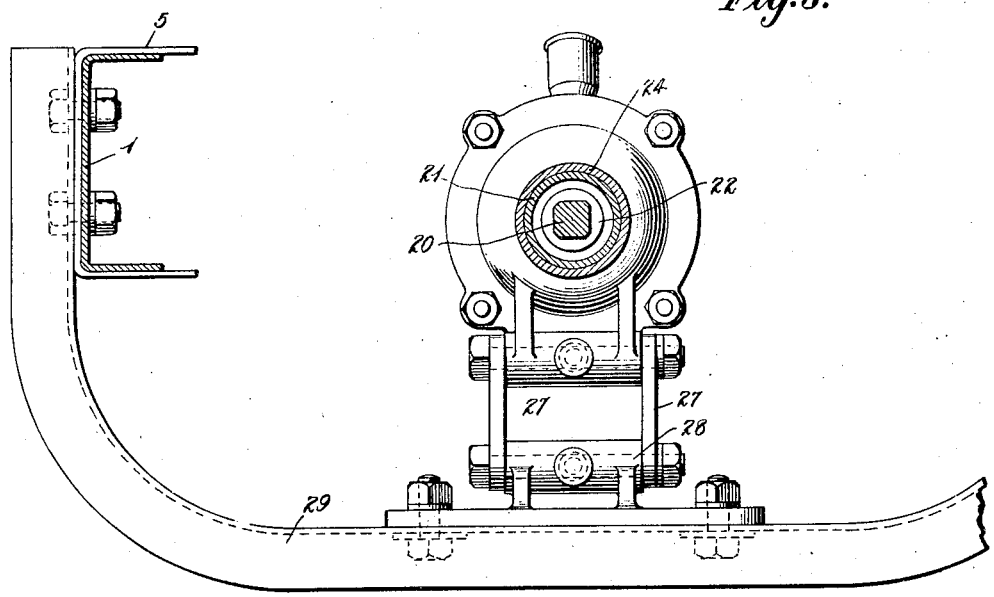
Figure 6:
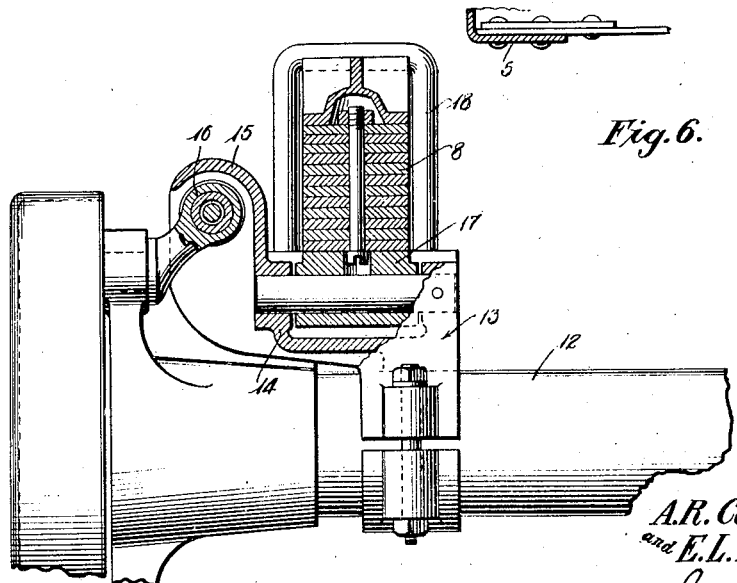

Fig. 1 is a top plan view.
Figure 2 is a side view.
Figure 3 is a longitudinal section.
Figure 4 is a section on line 4—4 of Figure 3; and,
Fig. 5 is a section on line 5—5 of Fig. 3.
Figure 6 is a detail view of the spring support.
Fig. 7 is a longitudinal sectional view of the auxiliary transmission employed.
Fig. 8 is a sectional view of the sliding and rockable locking key 38 for meshing with the selected gear.

Referring now in particular to the drawings wherein like reference characters indicate corresponding parts the numeral 1 designates the standard Ford truck frame which is well known in the art. Mounted on this frame is the usual driving motor 2 in the rear of which there is the usual Ford planetary gearing 3 controlled by the pedals 4. This gearing has two forward speeds and the usual reverse gearing.

Secured to the frame 1 is an extension frame 5 fastened thereto by bolts 6 and extending materially beyond the rear end 7 of the usual Ford truck frame, or other suitable truck to which the extension frame is applied. The extension frame carries side springs 8 being united at their forward ends to hangers 9, while the rear ends of the spring are attached to shackles 10 carried by brackets 11. The side springs are attached to the rear axle housing 12, by means of brackets 13 disposed at each side of the axle. Each bracket has a body 14 and a vertical arm 15, the vertical arm being pivoted to the spring perch 16 while the body receives and pivotally supports the spring plate 17 on which a spring is mounted. The body is united to the axle housing by clamps 18 and is supported thereby.

In passing now to the salient feature of this invention it will be observed that the driven shaft 20 extends from the transmission casing, this shaft having a housing 21 connected therewith by a ball and socket joint. The extension shaft is also connected to the transmission shaft by a universal joint. This extension shaft at its rear end is provided with a squared portion slidably fitted within a female member 22 in the universal 23 so as to provide a slip connection between this shaft and the universal. The universal 23 is furthermore placed within a housing 24 slidably engaging the housing for the extension shaft. The transmission shaft 25 is rigidly fitted to one of the members of the universal joint 23 and is surrounded by a torque tube or casing 26. This shaft at its forward end, and the extension shaft at its rear end are supported by links 27 pivoted to the universal housing 24 and also to brackets 28 mounted on the depending cross member 29 connected with the side frames of the vehicle. The links 27 permit a movement of the housing 24 and the transmission shaft 25 relative to the extension shaft. The transmission shaft 25 is connected with a transmission mechanism disposed within the casing 30. This structure is disclosed is our copending application Serial No. 2,905, filed January 16, 1925.

The transmission mechanism embodies gears constantly in mesh, that is to say, the change speed gears are constantly meshing and are selectively coupled in driving relation with the shafts on which they are mounted depending upon the speed desired. The transmission casing also has a transmission shaft 31 on which the gears 32 and 33 are loosely mounted. The transmission casing also contains the conventional counter shaft 34 on which there is mounted gears 35 and 36 driving the rotatable element 37 which in turn is connected to the differential. To couple the various gears to the shaft 31 a slidable and rocking coupling element 38 is employed by means of which selected gears may be connected with the shaft depending upon the speed desired. These coupling pins are shifted to the desired coupling position and then rocked to lock a selected gear to the driving shaft. A constantly meshing gear of this type is well known in the art and need not be described in detail herein. The lock pins are operated by the shaft 39, this shaft being connected with any suitable gear operating lever located near the driver's seat. With this type of transmission we have found that gear changes may be made even though the clutch has not entirely released. That is to say the gears are constantly in mesh and the proper gear can be coupled even though the transmission shaft is rotating. It will be understood that the auxiliary transmission will be used entirely in conjunction with the standard planetary transmission and may, for instance, provide a speed between the high and low planetary speeds, and a second speed above the high planetary speed, or if desirable, a speed below the low speed planetary gear.

The radius rods 40 connected with the rear axle are the standard radius rods used in a Ford truck. Due to the interposed transmission 30 these rods will not extend from the rear axle to the ball connection between the transmission shaft casing and the auxiliary shaft. It is highly desirable, however, to utilize these rods and in order that they may be used we provide a yoke 41 that surrounds the transmission shaft housing near its outer end, said yoke receiving a cross pin 42 to which the ends of the radius rods are attached. Connecting links 43 are also mounted on the bolt 42 said links extending forwardly and at their ends are connected to a depending ear 44 disposed below the housing for the extension drive shaft. A bolt 45 passes through these links and through an aperture in said ear. The bolt 42 on the yoke 41 also carries a rocking arm 46 to which the transmission shift rod 47 leading from the transmission casing 30 is attached. A gear shift rod 48 is also attached to this rocking arm 46 and this rod leads to any conventional form of gear shift lever.

From the foregoing description it will be seen that the present invention contemplates the use of a transmission wherein the gears are constantly in mesh as an auxiliary transmission to be employed in conjunction with a standard transmission of the planetary type so that even if the clutch controlling such planetary transmission does not entirely release various gear changes can be effected with the auxiliary transmission without danger of injury thereof. It is well-known that with a planetary transmission the structure is such that the clutch need not entirely release and in actual use it seldom does. It will also be appreciated that novel means are shown to permit the standard radius rods to be utilized in a frame wherein the distance between the extension shaft and the rear axle has been materially increased due to the interposed auxiliary transmission.

Having thus described the invention what we claim is:

1. In a motor vehicle the combination with a frame, a rear axle therefor, a transmission shaft, a torque tube therefor, radius rods connected with the rear axle, supports for said rods mounted on said torque tube intermediate the ends thereof and supplemental connecting means for securing the ends of the radius rods to a fixed element to prevent longitudinal movement of said radius rods relative to the torque tube.

2. In a motor vehicle the combination with a frame, a rear axle therefor, a transmission shaft, a torque tube therefor, radius rods connected with the rear axle, supports for said rods mounted on said torque tube intermediate the ends thereof, and supplemental connecting means for securing the ends of the radius rods to an attaching element, said supplemental connecting means embodying links connected to said radius rods for preventing longitudinal movement of the supports and radius rods relative to the torque tube.

3. In a motor vehicle a frame, a rear axle, a transmission shaft, a torque tube therefor, radius rods connected to the rear axle, a member on said tube intermediate its ends to which the rods are connected and a supplemental connector attached to said member to secure the radius rods in place, a shift rod for the transmission and a support therefor in said member.

4. In a motor vehicle, a frame, a rear axle, a transmission shaft, a torque tube therefor, a transmission between said shaft and rear axle, radius rods connected to the rear axle, a member operatively associated with said torque tube to which the rods are connected, a shift rod for said transmission and means for rockably securing said shift rod in said member.

5. In a motor vehicle, a frame, a rear axle, a transmission shaft, a torque tube therefor, a transmission between the shaft and rear axle, radius rods connected to the rear axle, a yoke-shaped member mounted on said torque tube and to which the radius rods are connected intermediate the ends of the torque tube, a shift rod for the transmission and a rocking arm connecting said shift rod to said yoke-shaped element.

6. In a motor vehicle, a frame, a rear axle, a transmission shaft, a torque tube therefor, a transmission between the shaft and rear axle, radius rods connected to the rear axle, a yoke-shaped element mounted on said torque tube, openings provided in the lower extremities of said element, a transverse cross pin supported by said element within the openings, said radius rods being secured at their forward ends to said cross pins and prevented from longitudinal movement relative to the torque tube.

7. In a motor vehicle, a frame, a rear axle, a transmission shaft, a torque tube therefor, a transmission between the shaft and rear axle, radius rods connected to the rear axle, a yoke-shaped element mounted on said torque tube, openings provided in the lower extremities of said element, a transverse cross pin supported by said element within the openings, said radius rods being secured at their forward ends to said cross pins and prevented from longitudinal movement relative to the torque tube, a shifter rod for said transmission, a rocking arm pivotally mounted on said cross pin for supporting said shift rod intermediate the ends of the torque tube.

8. In a motor vehicle, a frame, a rear axle, a transmission shaft, a transmission between the shaft and rear axle, radius rods connected to the rear axle, a torque tube for the transmission shaft, a U-shaped supporting element mounted on said torque tube intermediate its ends, a cross pin connected to said U-shaped element and adapted to retain said U-shaped element on the torque tube, said radius rods being supported at their forward ends to the cross pin, an upwardly extending arm rockably secured to said cross pin and extending to a point above the upper portion of the torque tube, a shift rod secured to said rockable arm and a supplemental connector attached to said pin and adapted to prevent relative longitudinal movement of said U-shaped element.

In testimony whereof we affix our signatures.

ALLEN R. COSGROVE.
EDWARD L. KRAFT.